United States Patent Office 3,234,149
Patented Feb. 8, 1966

3,234,149
POLY(PERFLUOROALKYL)METHYLENE AND PROCESS FOR ITS MANUFACTURE
Robert N. Haszeldine, Windy Ridge, Lyme Road, Disley, England, and Roy Fields, 7 Wolseley Place, Manchester 20, England
No Drawing. Filed Mar. 25, 1963, Ser. No. 267,849
Claims priority, application Great Britain, Mar. 27, 1962, 11,743/62
13 Claims. (Cl. 260—2)

This invention relates to fluorinated polymers and particularly to high-melting polymers containing repeating groups having the structure:

where R is a perfluoroalkyl, a perfluoroaryl, a perfluorochloroalkyl or a perfluorochloroaryl radical.

2,2,2-trifluorodiazoethane ($CF_3 \cdot CHN_2$) is a comparatively stable diazoalkane due to the presence of the trifluoromethyl group. It is not readily polymerized in solution by most of the catalysts commonly used to polymerize diazomethane and the higher non-fluorinated diazoalkanes. However, it can be polymerized in an ethereal solution by a catalyst consisting of ether containing cuprous iodide and methylamine. The product from this reaction is a poly(trifluoromethyl)methylene having a melting point of from 132 to about 145° C.

2,2,2-trifluorodiazoethane can also be polymerized by heating the compound to a temperature of 120° C in a sealed tube. This process yields as the principal product a poly(trifluoromethyl)methylene which has a melting point in the range of from 184° to about 190° C. and which is decomposed completely by heating for an hour or slightly longer at 290° C.

A third process for production of polymers from 2,2,2-trifluorodiazoethane consists of irradiating the diazoethane with ultraviolet light at a pressure greater than 1 atmosphere in a silica vessel. The products of this process include a poly(trifluoromethyl)methylene which has a melting point of from 220 to 235° C., and which is more stable and homogeneous than that obtained by the second process mentioned above. The products of both the heating and the irradiation process decompose when pyrolyzed in vacuum, giving good yields of trans-1,1,1,-4,4,4-hexafluorobutene-2.

While each of the above mentioned three processes yields some poly(trifluoromethyl)methylene neither solution polymerization nor polymerization by heating to 120° C., nor polymerization by irradiation provides a solid polymer stable to temperatures above about 235° C.

The present invention relates to highly crystalline polymers with high melting points derived from fluorinated diazo compounds, and particularly to a poly(trifluoromethyl)methylene with a melting point in excess of 300° C. This last polymer is particularly desirable because its melting point is close to that of the commercially important polytetrafluoroethylene and is higher than the melting point of any other known fluoropolymer.

By high melting point is meant a melting point substantially above that of polymers obtained by conventional polymerization of the same monomer in the presence of light.

By highly crystalline polymer is meant a polymer which exhibits a strongly ordered molecular structure.

While 2,2,2-trifluorodiazoethane is the most preferred starting material and the corresponding polymer, poly-(trifluoromethyl)methylene having a melting point above 300° C. is the preferred product of the present invention, the invention is applicable to the use of starting materials having the general formula:

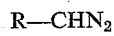

where R is a radical selected from the group consisting of perfluoroalkyl, perfluorochloroalkyl, perfluoroaryl and perfluorochloroaryl radical. The preferred starting materials are those in which R is selected from the group consisting of perfluoroalkyl and perfluoroaryl. Still more preferred are those starting materials in which R is a perfluoroalkyl. The most preferred starting materials for the practice of the invention are those compounds where R is a perfluoroalkyl group containing from 1 to about 4 carbon atoms such as 2,2,2-trifluorodiazoethane, 2,2,3,3,3 - pentafluorodiazopropane, 2,2,3,3,4,4,4 - heptafluorodiazobutane, and 2,2,3,3,4,4,5,5,5-nonafluorodiazopentane. The polymer obtained has the formula

where R is a radical selected from the group consisting of perfluoroalkyl, perfluorochloroalkyl, perfluoroaryl and perfluorochloroaryl radical. Their high melting points and the sharpness of their infrared spectra compared with those of other polymers show that they are highly crystalline polymers.

The starting materials for the practice of the present invention can be prepared by conventional means such as the method employed by Gilman and Jones, J.A.C.S. 65, pp. 1458 to 1460, for the preparation of 2,2,2-trifluorodiazoethane.

The compounds of the present invention have substantial utility in applications where their resistance to higher temperatures, their chemical stability, their good dielectric properties, and their low coefficients of friction are desirable. These applications include use as gaskets, dielectrics and insulating materials, non-lubricated bearings, coatings, fibers and films for packing for pump and valve shafts, valve diaphragms, electrical insulation, and specialized fabrics. Poly(trifluoromethyl)methylene with its particularly high melting point is especially valuable in this connection.

The valuable new products of the present invention are obtained by polymerizing compounds having the structure $R—CHN_2$ at a temperature not in excess of 100° C., in the absence of light. Polymerization is preferably carried out at temperatures of from 0 to about 50° C. and most preferably of from 15° to about 30° C. Pressures for the polymerization may range from 0.1 to 100 atmospheres, but preferably will be in the range of from 0.5 to 10 atmospheres and most preferably, from 1 to about 4 atmospheres. Because of the need for maintaining relatively mild temperature conditions during the polymerization, the reaction time for the polymerization process will range from 1 hour to as long as 10 years, with most polymerizations being virtually complete in from 24 hours to about 3 years. The reaction will preferably be conducted in the liquid phase and no reaction media need be used.

A weakly polar catalyst, preferably glass, will be employed in the preferred method for the practice of the process of the present invention.

The most preferred glasses are those heat resistant varieties which contain high amounts of $SiO_2$ and $B_2O_3$ such as those sold under the trade names "Pyrex" and "Dreadnought." A combination of two or more different types of the above preferred glasses may be used.

The above described starting materials of the present invention may be co-polymerized as, for example with a second member of the starting material group or with other diazo compounds, including diazoalkanes, both straight chain and cyclic, diazoaromatics, and with aryl substituted alkyl diazo compounds. Where desirable, cross linking may be achieved by co-polymerization with a compound having two or more diazo groups. The preferred co-polymerizing agents for cross-linkage are the alpha, omega, bis-diazoalkanes having from 2 to about 10 carbon atoms. In order to enhance the high thermal stability of the polymer product it is preferable that the co-polymerizing agent and cross-linking agent used in the practice of the present invention be perfluoro or perfluorochloro.

*Example 1*

1.23 g. by weight of 2,2,2-trifluorodiazoethane is sealed in vacuo in a vessel constructed of "Dreadnought" glass. The vessel is shielded from light and is maintained at from 18 to 26° C. for about 2½ years after which time the pressure in the vessel is between 2 and 3 atmospheres. At the end of this period, the vessel is opened and the following products are obtained:

0.137 g. by weight of nitrogen;
0.39 g. of unchanged 2,2,2-trifluorodiazoethane equivalent to 32% of that contained in the vessel initially;
0.41 g. by weight of a complex liquid mixture;
0.234 g. of poly(trifluoromethyl)methylene, representing a yield of 38% calculated on a molar basis.

The poly(trifluoromethyl)methylene is recovered and analyzed as follows.

Calculated: C, 29.3; H, 1.2%. Found: C, 29.2; H, 1.1%.

The melting point of the polymer was in excess of 300° C.

*Example 2*

0.0478 g. of the poly(trifluoromethyl)methylene prepared in Example 1 is heated in vacuo in a sealed tube for 2 hours at 360° C. Analysis of the contents of the tube at the end of this period indicates 0.029 g. of trans-1,1,1,4,4,4-hexafluorobutene-2 representing 61% yield based on the original polymer and calculated on a molar basis. A small quantity of charred residue remains in the tube.

*Example 3*

If 2,2,3,3,4,4,4-heptafluorodiazobutane is substituted for the 2,2,2-trifluorodiazoethane of Example 1, a solid polymeric material is obtained which is similar to poly(trifluoromethyl)methylene.

*Example 4*

If 2,2-dichloro-2-monofluorodiazoethane is substituted for the 2,2,2-trifluorodiazoethane used in Example 1, a solid polymeric material is obtained which resembles in its physical properties the poly(trifluoromethyl)methylene of Example 1.

*Example 5*

A quantity of pentafluorophenyldiazomethane is sealed in vacuo in a vessel constructed of "Pyrex" glass. The vessel is shielded from light and is maintained at room temperature for 6 months. At the end of this period the pressure in the vessel is substantially above atmospheric and analysis indicates the presence of nitrogen, some unchanged pentafluorodiazomethane and a quantity of poly(pentafluorophenyl)methylene, a solid polymeric material.

*Example 6*

Into a "Pyrex" vessel are placed a quantity of 2,2,2-trifluorodiazoethane and a quantity of 2,2,3,3-tetrafluoro-1,4-bisdiazo-n-butane in a molar ratio of about 8:1. The vessel is shielded from light and is maintained at room temperature for 1 month after which time the pressure in the vessel is above one atmosphere. Analysis of the contents indicates the presence of nitrogen, some unreacted 2,2,2-trifluorodiazoethane, some unreacted 2,2,3,3-tetrafluoro-1,4-bisdiazo-n-butane and a solid polymeric material which consists essentially of poly(trifluoromethyl)methylene structures, cross-linked with perfluoroethylene groups. The polymeric material has a melting point above 300° C.

It is to be understood that many other variations and embodiments are included within the scope of the invention in addition to those specifically described above; and that the embodiments described are for the purpose of illustrating and exemplifying the invention and the invention is not limited thereto.

What is claimed is:

1. Solid homopolymer derived from R—CHN$_2$ where in R is a perfluoro radical having from 1 to 6 carbon atoms selected from the class consisting of perfluoroalkyl, perfluorophenyl, perfluorochloroalkyl and perfluorochlorophenyl radicals, said homopolymer having a structure consisting essentially of repeating units of the group

wherein R is the same as defined above and having a melting point above 300° C. when R is perfluoroalkyl.

2. Solid homopolymer derived from 2,2,2-trifluorodiazoethane, said homopolymer having a melting point above about 300° C. and having a structure consisting essentially of repeating units of the group

3. A method for preparing solid homopolymer derived from R—CHN$_2$ wherein R is a perfluoro radical having from 1 to 6 carbon atoms selected from the class consisting of perfluoroalkyl, perfluorophenyl, perfluorochloroalkyl and perfluorochlorophenyl radicals, said homopolymer having a structure consisting essentially of repeating units of the group

wherein R is the same as defined above and having a melting point above 300° C. when R is perfluoroalkyl which comprises polymerizing said R—CHN$_2$ in the absence of light at a temperature of from 0 to about 50° C. in the pressure of a weakly polar catalyst consisting of glass essentially containing $SiO_2$ and $B_2O_3$.

4. The composition of claim 1 wherein R is a perfluoroalkyl radical, having from 1 to 6 carbon atoms.

5. The composition of claim 1 wherein R is a perfluoroaryl radical, having from 1 to 6 carbon atoms.

6. The composition of claim 1 wherein R is a perfluorochloroalkyl radical, having from 1 to 6 carbon atoms.

7. The composition of claim 1 wherein R is a perfluorochloroaryl radical, having from 1 to 6 carbon atoms.

8. The process of claim 3 wherein the catalyst is heat resistant glass containing $SiO_2$ and $B_2O_3$.

9. The process of claim 8 wherein R is a perfluoroalkyl radical, having from 1 to 6 carbon atoms.

10. The process of claim 8 wherein R is a perfluoroaryl radical, having from 1 to 6 carbon atoms.

11. The process of claim 8 wherein R is a perfluorochloroalkyl radical, having from 1 to 6 carbon atoms.

12. The process of claim 8 wherein R is a perfluorochloroaryl radical, having from 1 to 6 carbon atoms.

13. The process of claim 3 wherein R is a $CF_3$ radical.

References Cited by the Examiner

UNITED STATES PATENTS 2,549,580   4/1951   Denison et al. _____ 260—92.1

FOREIGN PATENTS 592,234   1/1958   Italy.

OTHER REFERENCES

Tobolsky: "Properties and Structures of Polymers," pages 43, 82, and 198, Wiley (1960).

Marvel: "An Introduction to Organic Chemistry of High Polymers," page 6, New York (1959).

Alfrey: "Mechanical Behavior of High Polymes," pages 340, and 500, New York (1948).

Chemical Week, page 175, Apr. 20, 1963.

JOSEPH L. SCHOFER, *Primary Examiner*

J. R. LIBERMAN, *Examiner.*